(12) United States Patent
Gervais et al.

(10) Patent No.: US 10,308,073 B2
(45) Date of Patent: Jun. 4, 2019

(54) TIRE COMPRISING A TREAD MADE UP OF SEVERAL ELASTOMERIC COMPOUNDS

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Philippe Gervais, Clermont-Ferrand (FR); Alain Durand, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 369 days.

(21) Appl. No.: 14/361,137

(22) PCT Filed: Nov. 15, 2012

(86) PCT No.: PCT/EP2012/072782
§ 371 (c)(1),
(2) Date: May 28, 2014

(87) PCT Pub. No.: WO2013/079336
PCT Pub. Date: Jun. 6, 2013

(65) Prior Publication Data
US 2014/0332132 A1  Nov. 13, 2014

(30) Foreign Application Priority Data

Nov. 29, 2011 (FR) ..................... 11 60899

(51) Int. Cl.
 *B60C 11/00* (2006.01)
 *B60C 1/00* (2006.01)

(52) U.S. Cl.
 CPC .......... *B60C 11/005* (2013.01); *B60C 1/0016* (2013.01); *B60C 11/00* (2013.01);
 (Continued)

(58) Field of Classification Search
 CPC ............................ B60C 11/005; B60C 11/00; B60C 11/0008; B60C 1/0016; B60C 2011/0025; B60C 2011/0016; B60C 2011/0033
 See application file for complete search history.

(56) References Cited

U.S. PATENT DOCUMENTS 5,504,137 A * 4/1996 Sandstrom ........... C08K 5/3432
                                                        524/492
5,843,249 A * 12/1998 Ryba ..................... B60C 1/0016
                                                        152/209.1

(Continued)

FOREIGN PATENT DOCUMENTS

EP    1897702 A1    3/2008
GB    1255952 A  * 12/1971
(Continued)

OTHER PUBLICATIONS

PCT/EP2012/072782, International Search Report (ISR), Form PCT/ISA/210, dated Feb. 12, 2013 (including English translation), 5 pgs.

*Primary Examiner* — Steven D Maki
(74) *Attorney, Agent, or Firm* — Dickinson Wright PLLC

(57) ABSTRACT

A tire with radial carcass reinforcement, comprising a crown reinforcement, itself capped radially by a tread connected to two beads by two sidewalls, the said tread comprising at least two radially superposed layers of polymer compound, a first layer of filled elastomeric compound, constituting the radially outer part of the tread, has a macrodispersion score Z higher than 80 and a maximum tan($\delta$) value, denoted tan($\delta$)max, lower than 0.130 and a second layer of elastomeric compound radially on the inside of the said first layer (Continued)

of elastomeric compound has an elongation at break at 60° C. that is higher than 600%.

18 Claims, 2 Drawing Sheets

(52) U.S. Cl.
CPC ... *B60C 11/0008* (2013.01); *B60C 2011/0016* (2013.01); *B60C 2011/0025* (2013.01); *B60C 2011/0033* (2013.01); *B60C 2200/06* (2013.01)

(56) References Cited

U.S. PATENT DOCUMENTS

| | | | | |
|---|---|---|---|---|
| 6,247,512 | B1* | 6/2001 | Radulescu | B60C 11/18 152/209.5 |
| 2007/0144642 | A1* | 6/2007 | Lukich | B60C 1/00 152/209.5 |
| 2008/0066840 | A1 | 3/2008 | Sandstrom et al. | |
| 2010/0059156 | A1* | 3/2010 | Cambron | B60C 11/00 152/209.5 |
| 2010/0069530 | A1* | 3/2010 | Hidrot | B60C 1/0016 523/157 |
| 2011/0265923 | A1* | 11/2011 | Arnold | B60C 1/0016 152/151 |
| 2012/0298271 | A1* | 11/2012 | Bijaoui | B60C 11/0309 152/209.25 |
| 2013/0197131 | A1* | 8/2013 | Fujikura | C08K 7/02 524/9 |

FOREIGN PATENT DOCUMENTS

| | | |
|---|---|---|
| JP | 1160810 A | 3/1999 |
| WO | 9736724 A2 | 10/1997 |
| WO | 2009057587 A1 | 5/2009 |
| WO | 2011034585 A2 | 3/2011 |
| WO | WO-2011/034585 A2 * | 3/2011 |
| WO | 2011064056 A1 | 6/2011 |
| WO | WO-2011/064056 A1 * | 6/2011 |

\* cited by examiner

TIRE COMPRISING A TREAD MADE UP OF SEVERAL ELASTOMERIC COMPOUNDS

This application is a 371 national phase entry of PCT/EP2012/072782, filed 15 Nov. 2012, which claims priority to FR 1160899, filed 29 Nov. 2011, the entire contents of which are incorporated by reference herein for all purposes.

BACKGROUND

1. Field

Disclosed herein is a tire with a radial carcass reinforcement and more particularly a tire intended to be fitted to vehicles carrying heavy loads and driving at sustained speeds, such as, for example, lorries, tractors, trailers or buses.

2. Description of Related Art

In general, in tires of the heavy vehicle type, the carcass reinforcement is anchored on each side in the region of the bead and is surmounted radially by a crown reinforcement consisting of at least two superposed layers formed of threads or cords which are parallel within each layer and crossed from one layer to the next, making angles of between 10° and 45° with the circumferential direction. The said working layers, which form the working reinforcement, may even be covered with at least one layer known as a protective layer and formed of reinforcing elements which are advantageously made of metal and extensible, known as elastic elements. It may also comprise a layer of metal cords or threads of low extensibility making with the circumferential direction an angle of between 45° and 90°, this ply, referred to as the triangulation ply, being situated radially between the carcass reinforcement and the first crown ply known as the working crown ply, formed of parallel threads or cords making angles at most equal to 45° in terms of absolute value. The triangulation ply, together with at least the said working ply, forms a triangulated reinforcement which, under the various stresses it encounters, deforms very little, the triangulation ply having the essential role of reacting the transverse compressive forces to which all of the reinforcing elements in the crown region of the tire are subjected.

In the case of tires for "heavy" vehicles, just one protective layer is usually present and its protective elements are, in the majority of cases, oriented in the same direction and at the same angle in terms of absolute value as the reinforcing elements of the radially outermost and therefore radially adjacent working layer. In the case of tires for construction plant, intended to run over rather uneven terrain, the presence of two protective layers is advantageous, the reinforcing elements being crossed from one layer to the next and the reinforcing elements of the radially inner protective layer being crossed with the inextensible reinforcing elements of the radially outer working layer adjacent to the said radially inner protective layer.

Radially on the outside of the crown reinforcement is the tread which is usually made up of polymer materials intended to come into contact with the ground in the contact patch where the tire is in contact with the ground.

Cords are said to be inextensible when the said cords exhibit, under a tensile force equal to 10% of the rupture force, a relative elongation at most equal to 0.2%.

Cords are said to be elastic when the said cords exhibit, under a tensile force equal to the rupture load, a relative elongation at least equal to 3% with a maximum tangent modulus of below 150 GPa.

The circumferential direction of the tire, or longitudinal direction, is the direction corresponding to the periphery of the tire and defined by the direction in which the tire runs.

The axis of rotation of the tire is the axis about which it turns during normal use.

A radial or meridian plane is a plane containing the axis of rotation of the tire.

The circumferential median plane or equatorial plane is a plane perpendicular to the axis of rotation of the tire and which divides the tire into two halves.

The transversal or axial direction of the tire is parallel to the axis of rotation of the tire. An axial distance is measured in the axial direction. The expression "axially on the inside of or, respectively, axially on the outside of means "of which the axial distance, measured from the equatorial plane, is less than or, respectively, greater than".

The radial direction is a direction intersecting the axis of rotation of the tire and perpendicular thereto. A radial distance is measured in the radial direction. The expression "radially on the inside of or, respectively, radially on the outside of" means "of which the radial distance, measured from the axis of rotation of the tire, is less than or, respectively, greater than".

Certain present-day tires, known as "road" tires, are intended to run at high speed and over increasingly long journeys because of the improvements to the road network and the growth of the motorway network throughout the world. All of the conditions in which a tire has to run undoubtedly allow an increase in the distance that the tire can cover, because tire wear is lower; however, the endurance of the tire and particularly of the crown reinforcement is penalized.

This is because there are stresses in the crown reinforcement and more particularly shear stresses between the crown layers, combined with a not-insignificant increase in operating temperature at the ends of the axially shortest crown layer, which have the effect of causing cracks to appear and spread through the rubber at the said ends. This problem exists in the case of the edges of two layers of reinforcing elements, the said layers not necessarily having to be radially adjacent.

In order to limit excessively great increases in temperature in the crown of the tire, the materials of which the tread is made are advantageously chosen to be those that have hysteresis losses suited to the operating conditions of the tire.

Moreover, in order to improve the endurance of the crown reinforcement of the type of tire being studied, solutions relating to the structure and quality of the layers and/or profiled elements of rubber compounds which are positioned between and/or around the ends of plies and, more particularly, the ends of the axially shortest ply, have already been applied.

In order to improve the resistance to degradation of the rubber compounds situated near the edges of the crown reinforcement, Patent FR 1 389 428 recommends the use, in combination with a low-hysteresis tread, of a profiled element of rubber covering at least the sides and marginal edges of the crown reinforcement and made of a low-hysteresis rubber compound.

In order to avoid separation between crown reinforcement plies, Patent FR 2 222 232 teaches coating the ends of the reinforcement with a wad of rubber, the Shore A hardness of which differs from that of the tread surmounting the said reinforcement and which is higher than the Shore A hardness of the profiled element of rubber compound positioned between the edges of crown reinforcement and carcass reinforcement plies.

French Application FR 2 728 510 proposes positioning, on the one hand between the carcass reinforcement and the crown reinforcement working ply radially closest to the axis of rotation, an axially continuous ply formed of inextensible metal cords making with the circumferential direction an angle of at least 60° and the axial width of which is at least equal to the axial width of the shortest working crown ply and, on the other hand, between the two working crown plies, an additional ply formed of metal elements oriented substantially parallel to the circumferential direction.

French Application WO 99/24269 also proposes, on each side of the equatorial plane and in the immediate axial continuation of the additional ply of reinforcing elements substantially parallel to the circumferential direction, that the two working crown plies formed of reinforcing elements that are crossed from one ply to the next be coupled over a certain axial distance and then uncoupled using profiled elements of rubber compound at least over the remainder of the width that the two working plies have in common.

This improvement to the endurance of the tires means that it is possible at least to consider the option of re-treading, when the tread is worn. Specifically, when it is desirable to re-tread the tire after the tread has worn away, it is necessary, in order to optimise the use of the new tread, to be able to re-tread a tire that is not at too advanced a stage of ageing.

In order further to increase tire life, it is common practice to choose polymeric materials of which to make the tread that have improved wear resistance properties, and because such materials usually penalize the hysteresis properties, it is also known practice to create the tread of a tire as a radial superposition of two different materials in order to obtain a compromise between wear properties and hysteresis properties that is satisfactory for the envisaged applications.

Such tires are, for example, described in document U.S. Pat. No. 6,247,512. That document describes the superposition of two layers of materials to form the tread, the external material coming into contact with the ground notably performing better in terms of wear, whereas the internal material has hysteresis properties that make it possible to limit the increase in tire temperature in the crown region.

Tires produced in this way are entirely satisfactory for the above-mentioned road-going applications. In order to ensure the possibility of re-treading, it is, however, recommended that excessive degradation of the internal material be avoided, this material wearing relatively rapidly as compared with the external material, so as not to risk damaging the reinforcement of the tire.

As a result, the use of the tread of such tires cannot be fully optimized without the risk of compromising the option of re-treading the tire.

SUMMARY

The inventors have therefore set themselves the task of providing tires that allow ever longer running distances before re-treading needs to be considered.

This objective has been achieved according to embodiments of the invention by a tire with radial carcass reinforcement, comprising a crown reinforcement, itself capped radially by a tread connected to two beads by two sidewalls, the said tread comprising at least two radially superposed layers of polymer compound, a first layer of filled elastomeric compound, constituting the radially outer part of the tread, having a macrodispersion score Z higher than 80 and a maximum $\tan(\delta)$ value, denoted $\tan(\delta)max$, lower than 0.130 and a second layer of elastomeric compound radially on the inside of the said first layer of elastomeric compound having an elongation at break at 60° C. that is higher than 600%.

For preference, according to embodiments of the invention, the ratio of the maximum value of $\tan(\delta)$, denoted $\tan(\delta)max$, of the elastomeric compound that constitutes the first layer to the maximum value of $\tan(\delta)$, denoted $\tan(\delta)$ max, of the elastomeric compound that constitutes the second layer is strictly lower than 1.

A macrodispersion score Z higher than 80 for a filled elastomeric compound means that the filler is dispersed in the elastomer matrix of the compound with a dispersion score Z of 80 or higher.

In the present description, the dispersion of filler in an elastomer matrix is characterized by the score Z which is measured, after crosslinking, using the method described by S. Otto et al. in "Kautschuk Gummi Kunststoffe, 58 Jahrgang, NR 7-8/2005" in accordance with standard ISO 11345.

Calculation of the score Z is based on the percentage surface area in which the filler is not dispersed ("non-dispersed % area"), as measured by the "disperGRADER+" device supplied with its operating instructions and operating software "disperDATA" by the Dynisco company, using the equation:

$$Z=100-(\text{non-dispersed \% area})/0.35$$

The non-dispersed surface area percentage is, for its part, measured using a camera that looks at the surface of the test specimen under light incident at 30°. Pale spots are associated with filler and agglomerates, whereas the darker spots are associated with the rubber matrix; digital processing converts the image into a black and white image and makes it possible to determine the non-dispersed percentage surface area as described by S. Otto in the abovementioned document.

The higher the score Z, the better the filler is dispersed in the rubber matrix (a score Z of 100 corresponds to a perfect dispersion and a score Z of 0 to a mediocre dispersion). It will be considered that a score Z equal to 80 or higher corresponds to a surface that exhibits very good dispersion of the filler in the elastomer matrix.

The elastomeric compounds that make up the tread are prepared using known methods.

In order to achieve a macrodispersion score Z higher than 80, the elastomeric compound that constitutes the radially outer part may advantageously be prepared by forming a masterbatch of diene elastomer and of reinforcing filler.

Within the meaning of embodiments of the invention, a "masterbatch" means a composite based on elastomer which has been loaded with filler.

There are various ways in which to obtain a masterbatch of diene elastomer and reinforcing filler. In particular, one type of solution involves, in order to improve the dispersion of the filler in the elastomer matrix, mixing the elastomer and the filler in the "liquid" phase. To do this, recourse is had to an elastomer in the form of a latex which comes in the form particles of elastomer dispersed in water, and an aqueous dispersion of the filler, namely a filler dispersed in water and commonly referred to as a "slurry".

Thus, according to one of the alternative forms of the invention, the masterbatch is obtained by liquid-phase mixing a diene elastomer latex containing natural rubber and an aqueous dispersion of a filler containing carbon black.

More preferably, still, the masterbatch according to embodiments of the invention is obtained using the following process steps, which yield a very good dispersion of the filler in the elastomer matrix:

supplying a first continuous stream of a diene elastomer latex to a mixing zone of a coagulation reactor defining an elongate coagulation zone extending between the mixing zone and an outlet, supplying the said mixing zone of the coagulation reactor with a second continuous stream of a fluid containing a filler under pressure in order to form a mixture with elastomer latex by mixing the first fluid and the second fluid in the mixing zone vigorously enough to coagulate the elastomer latex with the filler before the outlet, the said mixture flowing as a continuous stream towards the outlet zone and the said filler being able to coagulate the elastomer latex, collecting at the outlet of the reactor the coagulum obtained previously in the form of a continuous stream and drying it in order to collect the masterbatch.

Such a method of preparing a masterbatch in the liquid phase is described for example in document WO 97/36724.

The loss factor $\tan(\delta)$ is a dynamic property of the layer of rubber compound. It is measured on a visco analyser (Metravib VA4000) in accordance with standard ASTM D 5992-96. The response of a test specimen of vulcanized composition (cylindrical test specimen 4 mm thick and 400 $mm^2$ in cross section) subjected to simple alternating sinusoidal shear stresses at a frequency of 10 Hz and a temperature of 60° C. is recorded. A sweep of amplitude of deformation from 0.1 to 50% (on the outbound cycle) and then from 50% to 1% (on the return cycle) is carried out. On the return cycle, the maximum value of $\tan(\delta)$ observed, and denoted $\tan(\delta)_{max}$, is indicated.

The rolling resistance is the resistance that appears as the tire is rolling and reveals the increase in temperature of the said tire. It is thus represented by the hysteresis losses associated with the deformation of the tire during one revolution. The $\tan(\delta)$ values for the materials used are measured at 10 Hz between 30 and 100° C. in order to incorporate the effect of the various induced frequencies of deformation during revolving of the tire. The value of $\tan(\delta)$ at 60° C. thus corresponds to an indication of the rolling resistance of the tire when it is running.

It is also possible to estimate the rolling resistance by measuring the rebound energy losses of the test specimens to an imposed energy at temperatures of 60° C. and expressed as a percentage.

Advantageously according to embodiments of the invention, the loss at 60° C., denoted P60, of the first layer of filled elastomeric compound constituting the radially outer part of the tread is lower than 22%.

Tensile testing makes it possible to determine the elastic stresses and properties at break. It is performed in accordance with standard AFNOR-NF-T-46-002 of September 1988. The nominal secant modulus (or apparent stress in MPa) is measured in second elongation (i.e. after an accommodation cycle at the degree of extension intended for the measurement itself) at 100% elongation (denoted MA100) or at 10% elongation (denoted MA10). The tension measurements for determining the accommodated secant moduli are taken at a temperature of 23° C.+/−2° C. under normal hygrometric conditions (50+/−5% relative humidity) in accordance with French standard NF T 40-101 (December 1979).

The rupture stresses (in MPa) and the elongations at break (in %) are also measured. The tension measurements for determining the rupture properties are taken at the temperature of 60° C.±2° C., and under normal hygrometric conditions (50±5% relative humidity) in accordance with French standard NF T 40-101 (December 1979).

Advantageously according to embodiments of the invention, the energy at break of the second layer of elastomeric compound radially on the inside of the said first layer of polymeric compound is higher than 165 MJ.

The inventors have first of all been able to demonstrate that the combination of a first filled elastomeric compound having a macrodispersion score Z higher than 80 and a $\tan(\delta)$max value of below 0.130, by way of tread material that comes into contact with the ground, and of a second elastomeric compound having an elongation at break higher than 600% as radially innermost tread material, leads to a compromise between the wear resistance properties and the increases in temperature at the crown of the tire that is satisfactory for road use as described hereinabove. This is because even though the radially innermost second material of the tread may have hysteresis properties that are not very advantageous as far as tire crown temperature rise is concerned, the choice of the filled first elastomeric compound that has a macrodispersion score Z higher than 80 allows the higher hysteresis losses of the radially innermost material of the tread to be compensated for while at the same time preserving good wearing performance.

It therefore turns out that the tread is thus made up of at least two different materials in a contrary arrangement to the tires usually produced and as set out hereinabove. Specifically, in contrast with the more conventional tires, the radially outermost first material of the tread may make it possible to achieve the desired hysteresis properties for the tire if the hysteresis losses of the radially innermost second material are too high. The tire according to the invention thus has a radial stack of elastomeric materials which is the opposite of conventional tires as far as the hysteresis properties of the said materials are concerned. As explained previously, in more usual tires, the radially inner layer of elastomeric compound is actually introduced on account of its hysteresis properties that favour less heating-up of the tread.

The inventors have also been able to demonstrate that the radially innermost second elastomeric compound of the tread which has a higher elongation at break, allows greater distance to be covered before re-treading is necessary than can be achieved with more usual tires.

The inventors believe that they have demonstrated that when the first layer of the tread has worn down and the tread therefore becomes less thick, the tires become more sensitive to certain types of attack, notably scrubbing, cutting, or penetration by small stones or other objects. Scrubbing is a form of tire wear that occurs notably when driving over roundabouts or even during parking manoeuvres. The use of the radially innermost second elastomeric compound of the tread which has an elongation at break higher than 600% leads to better resistance to this type of attack.

According to one preferred embodiment of the invention, the elongation at break of the second layer of elastomeric compound radially on the inside is higher than that of the first layer of filled elastomeric compound constituting the radially outer part of the tread.

Preferably also, the energy at break of the second layer of elastomeric compound is higher than that of the first layer of filled elastomeric compound that constitutes the radially outer part of the tread.

According to an advantageous alternative form of the invention, the ratio of the volume of the layer of the second elastomeric compound to the sum of the volumes of the first and second elastomeric compounds is comprised between 25 and 70%.

The profile of the second elastomeric compound when viewed in a meridian cross section through the tire is such that it appears substantially simultaneously across the entire width of the tread as the said tread wears down. The tire designer will know how to define such a profile according to the dimension and intended use of the tire.

Advantageously also, the ratio of the thickness, measured in the radial direction at the end of the radially outermost working layer in a meridian section of the tire, of the layer of the second elastomeric compound to the sum of the thicknesses, measured in the radial direction at the end of the radially outermost working layer in a meridian section of the tire, of the first and second elastomeric compounds is comprised between 15 and 50%.

One advantageous alternative form of the invention also foresees the presence of a layer of a third elastomeric compound radially on the inside of the second elastomeric compound and in contact therewith, and having a maximum value of tan(δ), denoted tan(δ)max, lower than 0.100.

Advantageously also, the layer of a third elastomeric compound radially on the inside of the second elastomeric compound and in contact therewith, has a loss at 60° C., denoted P60, of less than 20%.

The presence of this third layer may make it possible to reduce the increases in temperature of the tread during the desired use of the tire still further, notably when the second elastomeric compound has hysteresis properties that have a tendency to increase the said temperature.

The presence of this third layer may even make it possible to reduce the operating temperature of the tire in the crown region so as to allow the rolling resistance of the tire to be lowered.

More particularly in the case of a tire the tread pattern of which consists of parallel ribs, the third layer of elastomeric compound is advantageously discontinuous. It is preferably then interrupted under the grooves.

In this last embodiment, it is advantageously possible to re-groove the tread pattern before having to consider re-treading without the risk of the said third layer of elastomeric compound becoming visible at the surface of the tread.

Advantageously according to this last embodiment, the ratio of the volume of the layer of the second elastomeric compound to the sum of the volumes of the three elastomeric compounds is comprised between 20 and 40%.

Advantageously also according to this last embodiment, the ratio of the volume of the layer of the third elastomeric compound to the sum of the volumes of the three elastomeric compounds is comprised between 10 and 30%.

According to this last embodiment, the ratio of the thickness, measured in the radial direction at the end of the radially outermost working layer in a meridian section of the tire, of the layer of the second elastomeric compound to the sum of the thicknesses, measured in the radial direction at the end of the radially outermost working layer in a meridian section of the tire, of the three elastomeric compounds is advantageously comprised between 10 and 30%.

Advantageously also according to this last embodiment, the ratio of the thickness, measured in the radial direction at the end of the radially outermost working layer in a meridian section of the tire, of the layer of the third elastomeric compound to the sum of the thicknesses, measured in the radial direction at the end of the radially outermost working layer in a meridian section of the tire, of the three elastomeric compounds is comprised between 10 and 30%.

According to the invention, the aforementioned volume and thickness measurements are taken on tires in the new condition, which have not yet run and which therefore exhibit no tread wear.

According to one embodiment of the invention, the crown reinforcement of the tire is formed of at least two working crown layers of inextensible reinforcing elements which are crossed from one layer to the other making with the circumferential direction angles comprised between 10° and 45°.

According to other embodiments of the invention, the crown reinforcement further comprises at least one layer of circumferential reinforcing elements.

One embodiment of the invention is also for the crown reinforcement to be supplemented radially on the outside by at least one additional layer, referred to as a protective layer, of reinforcing elements referred to as elastic, which are oriented with respect to the circumferential direction at an angle comprised between 10° and 45° and in the same direction as the angle formed by the inextensible elements of the working layer radially adjacent to it.

According to any one of the embodiments of the invention which has been mentioned hereinabove, the crown reinforcement may even be supplemented, radially on the inside between the carcass reinforcement and the radially inner working layer closest to the said carcass reinforcement, by a triangulation layer of inextensible metal reinforcing elements made of steel making, with the circumferential direction, an angle greater than 60° and in the same direction as that of the angle formed by the reinforcing elements of the radially closest layer of the carcass reinforcement.

BRIEF DESCRIPTION OF DRAWINGS

Other details and advantageous features of the invention will become apparent hereinafter from the description of some embodiments of the invention with reference to FIGS. 1 and 2 which depict.

DETAILED DESCRIPTION OF SPECIFIC EMBODIMENTS

To make them easier to understand, the figures have not been drawn to scale. The figures depict only a half view of a tire which extends symmetrically about the axis XX' which represents the circumferential median plane, or equatorial plane, of a tire.

Figure 1:
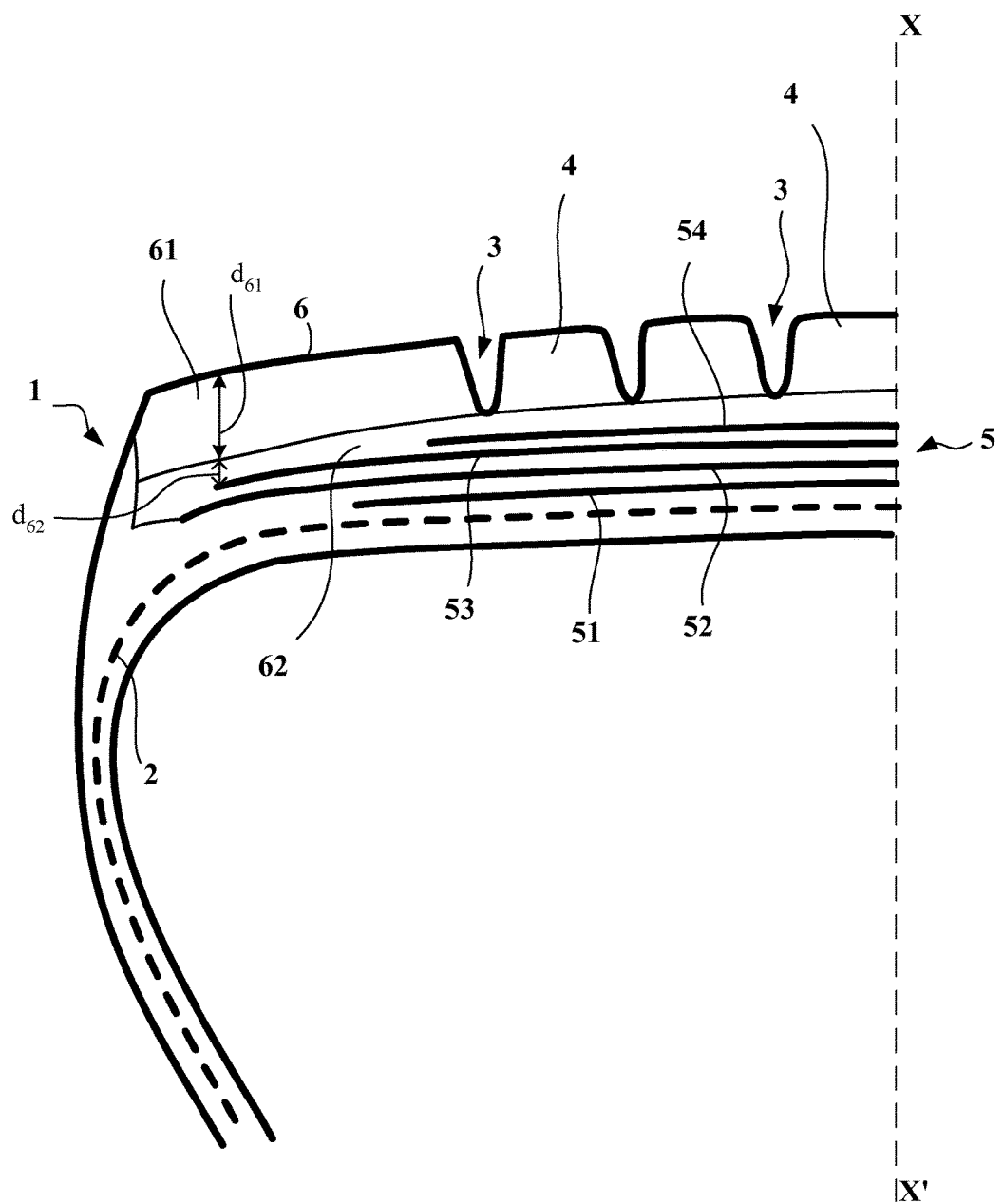
FIG. 1: a meridian view of a diagram of a tire according to a first embodiment of the invention.

In FIG. 1, the tire 1, of dimension 385/65 R 22.5, comprises a radial carcass reinforcement 2 anchored in two beads around bead wires. The carcass reinforcement 2 is formed of a single layer of metal cords. The carcass reinforcement 2 is hooped by a crown reinforcement 5, itself capped by a tread 6. The tread 6 has grooves 3 that form ribs 4.

The bottom regions and beads of the tire 1 have notably not been depicted in FIG. 1.

In FIG. 1, the crown reinforcement 5 is formed radially, from the inside to the outside:

of a triangulation layer 51 formed of inextensible non-wrapped 9.35 metal cords which are continuous across the entire width of the ply, oriented at an angle equal to 65°, of a first working layer 52 formed of non-wrapped inextensible 11.35 metal cords which are continuous across the entire width of the ply, oriented at an angle equal to 18°, of a second working layer 53 formed of non-wrapped inextensible 11.35 metal cords, which are continuous across the entire width of the ply, oriented at an angle equal to 18° and crossed with the metal cords of the first working layer, of a protective layer 54 formed of non-wrapped elastic 6.35 metal cords, which are continuous across the entire width of the ply, oriented at an angle equal to 18° in the same direction as the metal cords of the working layer 53.

According to an embodiment of the invention, the tread 6 is made up of a radially outer first layer 61 which comes into contact with the ground and of a radially inner layer 62.

The layer 61 is made up of a filled elastomeric compound having a macrodispersion score Z equal to 90 and a $\tan(\delta)$ max value equal to 0.126. Its loss value at 60, denoted P60, is equal to 21%.

The layer 62 is made up of an elastomeric compound having an elongation at break at 60° C. equal to 650%. The value of the energy at break of the layer 62 is equal to 170 MJ. The $\tan(\delta)$max value is equal to 0.141.

The ratio of the $\tan(\delta)$max value of the elastomeric compound that constitutes the layer 61 to the $\tan(\delta)$max value for the elastomeric compound that constitutes the layer 62 is equal to 0.89 and therefore strictly lower than 1.

The ratio of the volume of the layer 62 of the second elastomeric compound to the sum of the volumes of the layers 61 and 62 is equal to 42%.

The ratio of the thickness $d_{62}$, measured in the radial direction at the end of the radially outermost working layer 53, of the layer 62, to the sum of the thicknesses $d_{61}$ and $d_{62}$, measured in the radial direction at the end of the working layer 53, of the layers 61 and 62 is equal to 33%.

Figure 2:
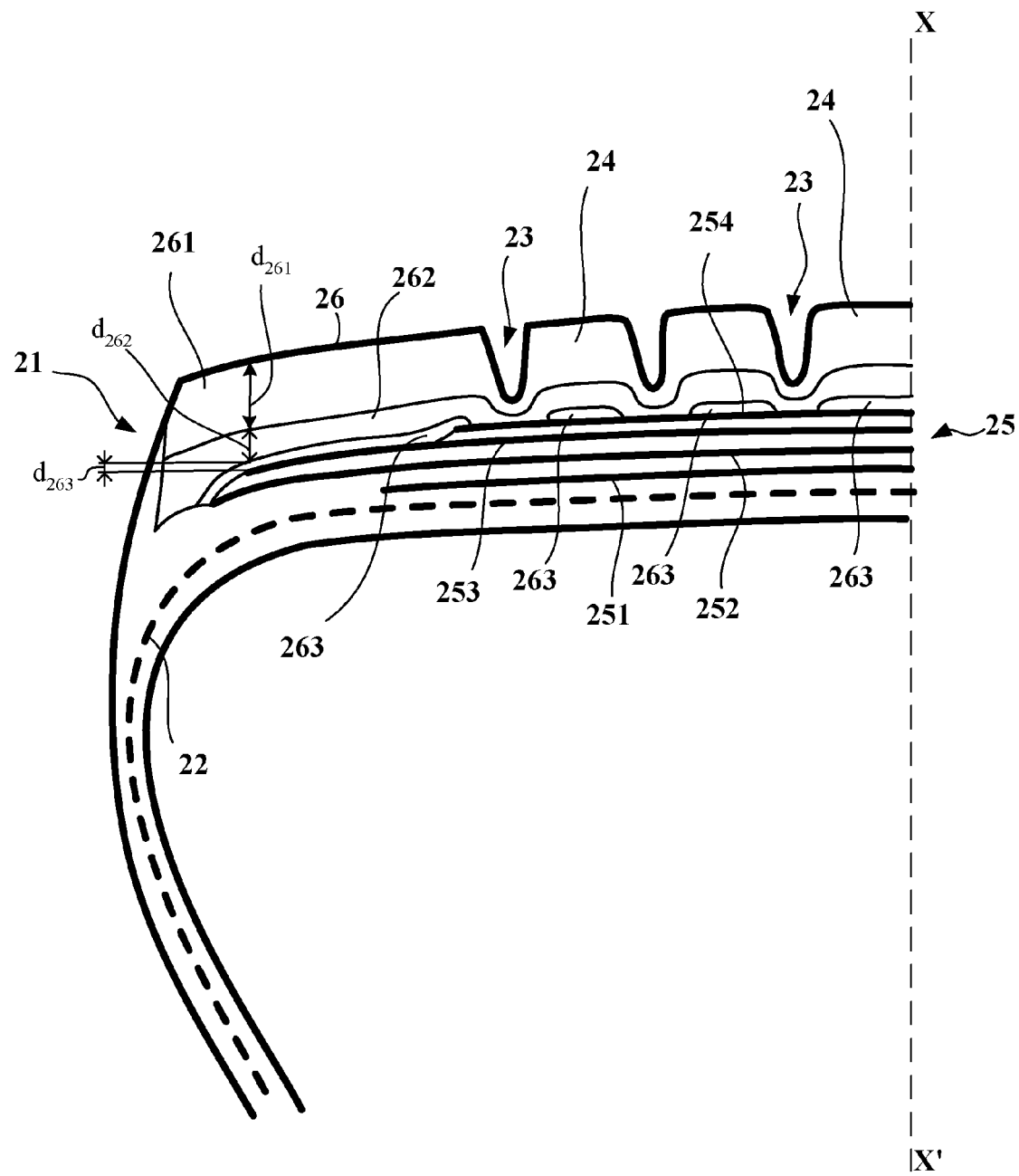
FIG. 2: a meridian view of a diagram of a tire according to a second embodiment of the invention.

FIG. 2, according to an alternative form of the invention, depicts a tire 21 similar to that of FIG. 1 and which differs therefrom through the presence of a third layer 263. This layer 263 is placed in contact with the crown reinforcement and radially on the inside of the layer 262. This layer 263 is also radially interrupted under the grooves so as to allow re-grooving steps to be carried out before it is necessary to consider the steps of re-treading in order to recreate the tread patterns without the risk of the layer 263 appearing at the surface of the tread.

The layer 263 consists of an elastomeric compound having a maximum $\tan(\delta)$ value, denoted $\tan(\delta)$max, equal to 0.075.

The layer 263 exhibits a loss at 60° C., denoted P60, equal to 13%.

The ratio of the volume of the layer 262 to the sum of the volumes of the layers 261, 262 and 263 is equal to 26%.

The ratio of the volume of the layer 263 to the sum of the volumes of the three layers 261, 262 and 263 is equal to 10%.

The ratio of the thickness $d_{262}$, measured in the radial direction at the end of the working layer 253, of the layer 262 to the sum of the thicknesses $d_{261}$, $d_{262}$ and $d_{263}$, measured in the radial direction at the end of the layer 253, of the three layers 261, 262 and 263 is equal to 17%.

The ratio of the thickness $d_{263}$, measured in the radial direction at the end of the working layer 253, of the layer 263 to the sum of the thicknesses $d_{261}$, $d_{262}$ and $d_{263}$, measured in the radial direction at the end of the layer 253, of the three layers 261, 262 and 263 is equal to 13%.

Four tires were produced using the three elastomeric compounds described hereinbelow, with some of their properties.

|  | Compound A | Compound B | Compound C |
|---|---|---|---|
| NR | 100 | 100 | 100 |
| Black N234 | 50 | | |
| Black N220 | | 47.5 | |
| Black N330 | | | 35 |
| Silica 165G | | | 10 |
| Antioxidant (6PPD) | 2 | 1.5 | 1 |
| Stearic acid | 2.5 | 2.5 | 1.5 |
| Zinc Oxide | 2.7 | 2.7 | 4.5 |
| Trimethyl quinolene | 1 | 1 | |
| Paraffin 6266 | 1 | 1 | |
| Silane on black | | | 2 |
| Sulphur | 1.7 | 1.5 | 1.6 |
| CBS accelerator | 0.7 | 0.6 | 1.5 |
| Z Score | 90 | 73 | 40 |
| $MA_{10}$ (MPa) | 4.7 | 4.7 | 4.4 |
| $MA_{100}$ (MPa) | 1.7 | 1.75 | 2.1 |
| Elongation at break (% at 60° C.) | 580 | 650 | 535 |
| Energy at break (MJ) | 162 | 170 | 142 |
| $\tan(\delta)_{max}$ | 0.126 | 0.141 | 0.075 |
| P60 (%) | 21 | 23.5 | 13 |

The first tire is a reference tire R1 produced with a configuration similar to the depiction in FIG. 1 but corresponding to usual embodiments as described hereinabove. It combines a compound B present radially on the outside of the tread and a compound C radially on the inside. The volume of compound C is usually defined by those skilled in the art such that the operating temperature of the tire corresponds to the intended type of running with such a tire. In this particular instance, the volume of compound C represents 10% of the sum of the volumes of compounds B and C.

A second reference tire R2 was produced although that tire does not correspond to any conventional tire. The tread of this tire R2 consists solely of compound A.

A first tire T1 according to the invention and more particularly according to the scenario of FIG. 1 combines, to form the tread, the compound A which forms the radially outer part and the compound B which forms the radially inner part of the tread.

The ratio of the volume of compound B of the second elastomeric compound to the sum of the volumes of compounds A and B is equal to 42%.

The second tire T2 produced in accordance with the invention is likenable to that of FIG. 2. The tread of tire T2 consists radially from the outside of a layer of compound A, of a layer of compound B and of an interrupted layer of compound C.

The ratio of the volume of compound B to the sum of the volumes of compounds A, B and C is equal to 26%.

The ratio of the volume of compound C to the sum of the volumes of the three compounds A, B and C is equal to 10%.

In order to perform a comparison, similar tests were run on all four tires.

The first tests involved evaluating the distance the tires could cover before they were re-treaded.

The tests were carried out under load and speed conditions that were defined to lead to tread wear and attack of the reference tire R1 that allowed it to be re-treaded after covering a distance, assigned the value 100, covered under the said conditions of this test. The wear performance is evaluated on a heavy goods vehicle when driving along the open road over journeys representative of the types of use conventionally seen with heavy goods vehicles. The attack performance is evaluated on a heavy goods vehicle manoeuvring on ground that has roughnesses.

The results obtained are indicated in the following table:

|      | Tire R1 | Tire R2 | Tire T1 | Tire T2 |
|------|---------|---------|---------|---------|
| Wear | 100     | 120     | 115     | 115     |
| Attack | 100   | 85      | 100     | 100     |

These results show that the tires according to the invention can be run further before needed re-treading. As mentioned earlier, the presence of compound B radially on the inside of compound A limits attack and allows longer running and provides better resistance to wear and to attack due notably to the scrubbing phenomena that occur when tread wear is already very advanced.

Rolling resistance measurements were also taken on each of the four tires under identical running conditions and on a fifth tire denoted R0, which differs from the other tires in that it has a tread consisting of compound B alone. The results of the measurements are indicated in the following table; they are expressed in kg/t, a value of 100 being assigned to tire R1.

| Tire R0 | Tire R1 | Tire R2 | Tire T1 | Tire T2 |
|---------|---------|---------|---------|---------|
| 108     | 100     | 101     | 103     | 95      |

These values demonstrate the benefit of using compound A to limit the rolling resistance of the tire, notably by comparison with compound B usually used at the surface of the tread.

This is because although the rolling resistance of the tire T1 is slightly higher than that of the tire R1, the improvement in terms of wear leads to a compromise between wear, resistance to attack and rolling resistance that is markedly in favour of tire T1.

Considering the two tables as a whole shows that a tread made up of compound A alone offers a compromise between wear, resistance to attack and rolling resistance that is somewhat lacking in attraction. Furthermore, compound A notably because of the way in which it is prepared, has a higher cost than a more usual compound of type B or C.

A comparison between tires T1 and T2 shows that the presence of an interrupted layer C may offer a not-insignificant benefit in terms of rolling resistance while at the same time preserving satisfactory wear and attack properties. Further, the cost of manufacture of the tire T2 may be lower than that of the tire T1 notably if the tread is produced in the same way for the two tires. This may for example be a method involving the co-extrusion of the compounds allowing the tread to be produced with various compounds, these forming continuous or discontinuous layers. In the case of the tire T1, this is two-shot extrusion (simultaneous extrusion of two compounds A and B) whereas in the case of the tire T2 it is three-shot extrusion (simultaneous extrusion of the three compounds A, B And C).

Furthermore, because the presence of the layer of compound C is interrupted under the grooves, it is possible to carry out a re-grooving step in order to recreate the grooves before it is necessary to consider re-treading. From this viewpoint, the presence of the layer of compound C therefore does not penalize tire T2 by comparison with tire T1

The invention claimed is:

1. A tire with radial carcass reinforcement, comprising:
a crown reinforcement including a radially outermost working layer extending between a pair of ends,
a tread radially capping the crown reinforcement, connected to two beads by two sidewalls, and comprising at least two radially superposed layers of polymer compound, comprising a first layer of filled elastomeric compound, constituting the radially outer part of the tread, has a macrodispersion score Z higher than 80 and a maximum tan(δ) value, denoted tan(δ)max, lower than 0.130, and a second layer of elastomeric compound radially on the inside of and in abutting relationship with the said first layer of elastomeric compound having an elongation at break at 60° C. that is higher than 600%, and wherein the second layer of elastomeric compound viewed in a meridian cross section extends continuously across the tread.

2. The tire according to claim 1, wherein a ratio of the maximum value of tan(δ), denoted tan(δ)max, of the elastomeric compound that constitutes the first layer to the maximum value of tan(δ), denoted tan(δ)max, of the elastomeric compound that constitutes the second layer is strictly lower than 1.

3. The tire according to claim 1, wherein a loss at 60° C., denoted P60, of the first layer of filled elastomeric compound constituting the radially outer part of the tread is lower than 22%.

4. The tire according to claim 1, wherein an energy at break of the second layer of elastomeric compound radially on the inside of the said first layer of polymeric compound is higher than 165 MJ.

5. The tire according to claim 1, wherein an elongation at break of the second layer of elastomeric compound radially on the inside is higher than that of the first layer of filled elastomeric compound constituting the radially outer part of the tread.

6. The tire according to claim 1, wherein an energy at break of the second layer of elastomeric compound is higher than that of the first layer of filled elastomeric compound that constitutes the radially outer part of the tread.

7. The tire according to claim 1, wherein a ratio of the volume of the layer of the second elastomeric compound to the sum of the volumes of the first and second elastomeric compounds is comprised between 25 and 45%.

8. The tire according to claim 1, wherein a ratio of the thickness, measured in the radial direction at the end of the radially outermost working layer in a meridian section of the tire, of the layer of the second elastomeric compound to the sum of the thicknesses, measured in the radial direction at the end of the radially outermost working layer in a meridian section of the tire, of the first and second elastomeric compounds is comprised between 15 and 35%.

9. The tire according to claim 1, wherein said tire further comprises a layer of a third elastomeric compound radially on the inside of the second elastomeric compound and in contact therewith, and wherein said layer of a third elastomeric compound has a maximum value of tan(δ), denoted tan(δ)max, lower than 0.100.

10. The tire according to claim 1, wherein said tire further comprises a layer of a third elastomeric compound radially on the inside of the second elastomeric compound and in contact therewith, and wherein the layer of a third elastomeric compound radially on the inside of the second elastomeric compound has a loss at 60° C., denoted P60, of less than 20%.

11. The tire according to claim 9, wherein the ratio of the volume of the layer of the second elastomeric compound to the sum of the volumes of the three elastomeric compounds is comprised between 20 and 30%.

12. The tire according to claim 9, wherein the ratio of the volume of the layer of the third elastomeric compound to the sum of the volumes of the three elastomeric compounds is comprised between 10 and 20%.

13. The tire according to claim 9, wherein a ratio of the thickness, measured in the radial direction at the end of the radially outermost working layer in a meridian section of the tire, of the layer of the second elastomeric compound to the sum of the thicknesses, measured in the radial direction at the end of the radially outermost working layer in a meridian section of the tire, of the three elastomeric compounds is comprised between 10 and 20%.

14. The tire according to claim 9, wherein a ratio of the thickness, measured in the radial direction at the end of the radially outermost working layer in a meridian section of the tire, of the layer of the third elastomeric compound to the sum of the thicknesses, measured in the radial direction at the end of the radially outermost working layer in a meridian section of the tire, of the three elastomeric compounds is comprised between 10 and 20%.

15. The tire according to claim 10, wherein the ratio of the volume of the layer of the second elastomeric compound to the sum of the volumes of the three elastomeric compounds is between 20 and 30%.

16. The tire according to claim 10, wherein the ratio of the volume of the layer of the third elastomeric compound to the sum of the volumes of the three elastomeric compounds is comprised between 10 and 20%.

17. The tire according to claim 10, wherein a ratio of the thickness, measured in the radial direction at the end of the radially outermost working layer in a meridian section of the tire, of the layer of the second elastomeric compound to the sum of the thicknesses, measured in the radial direction at the end of the radially outermost working layer in a meridian section of the tire, of the three elastomeric compounds is comprised between 10 and 20%.

18. The tire according to claim 10, wherein a ratio of the thickness, measured in the radial direction at the end of the radially outermost working layer in a meridian section of the tire, of the layer of the third elastomeric compound to the sum of the thicknesses, measured in the radial direction at the end of the radially outermost working layer in a meridian section of the tire, of the three elastomeric compounds is comprised between 10 and 20%.

* * * * *